US012799384B2

(12) United States Patent
Lin et al.

(10) Patent No.: US 12,799,384 B2
(45) Date of Patent: Nov. 17, 2026

(54) TREATMENT OF SUBTERRANEAN FORMATIONS WITH CROSSLINKED FLUIDS

(71) Applicants: CNPC USA Corporation, Houston, TX (US); Beijing Huamei, Inc., Beijing (CN); Xinjiang Oilfield Co., Karamay City (CN)

(72) Inventors: Lijun Lin, Houston, TX (US); Chuanxin Zhang, Karamay (CN); Guodong Wu, Karamay City (CN); Bo Huang, Karamay City (CN); Stephanie Yu, Houston, TX (US)

(73) Assignees: CNPC USA Corporation, Houston, TX (US); Beijing Huamei, Inc., Beijing (CN); Xinjiang Oilfield Co., Karamay City (CN)

( * ) Notice: Subject to any disclaimer, the term of this patent is extended or adjusted under 35 U.S.C. 154(b) by 0 days.

(21) Appl. No.: 19/224,630

(22) Filed: May 30, 2025

(65) Prior Publication Data

US 2025/0289996 A1 Sep. 18, 2025

Related U.S. Application Data

(62) Division of application No. 16/948,403, filed on Sep. 16, 2020, now Pat. No. 12,319,872.

(51) Int. Cl.

| | |
|---|---|
| ***C09K 8/68*** | (2006.01) |
| ***C09K 8/66*** | (2006.01) |
| ***E21B 43/26*** | (2006.01) |
| ***E21B 43/267*** | (2006.01) |

(52) U.S. Cl.

CPC .............. *C09K 8/685* (2013.01); *C09K 8/665* (2013.01); *E21B 43/26* (2013.01); *E21B 43/267* (2013.01)

(58) Field of Classification Search

CPC ......... C09K 8/685; C09K 8/665; E21B 43/26; E21B 43/267

See application file for complete search history.

(56) References Cited

U.S. PATENT DOCUMENTS

| | | | | |
|---|---|---|---|---|
| 2003/0092584 A1* | 5/2003 | Crews | C09K 8/685 | 507/200 |
| 2011/0030962 A1* | 2/2011 | Parris | C09K 8/685 | 166/310 |
| 2016/0130496 A1* | 5/2016 | Holtsclaw | C09K 8/685 | 507/224 |
| 2017/0355900 A1* | 12/2017 | Nelson | C08B 37/0087 | |
| 2019/0048252 A1* | 2/2019 | Fu | C09K 8/665 | |
| 2020/0308477 A1* | 10/2020 | Patil | C09K 8/88 | |

* cited by examiner

*Primary Examiner* — Crystal J Lee

(74) *Attorney, Agent, or Firm* — Hogan Lovells Cadwalader US LLP

(57) ABSTRACT

Disclosed herein is a crosslinked HPG fluid system using a very low concentration of HPG polymer. The fluid system is able to be used at low HPG concentrations while maintaining stable viscosity for over two hours at elevated temperatures.

12 Claims, 4 Drawing Sheets

TREATMENT OF SUBTERRANEAN FORMATIONS WITH CROSSLINKED FLUIDS

CROSS-REFERENCE TO RELATED APPLICATIONS

This application is a divisional of U.S. patent application Ser. No. 16/948,403, filed Sep. 16, 2020, which is incorporated in its entirety herein for all purposes.

FIELD

The disclosure relates generally to the oil and gas industry. The disclosure relates specifically to fracturing fluids.

BACKGROUND

Tight oil and gas reservoirs often require fracturing to obtain the oil and gas present. An example of a tight oil and gas reservoir is in Xinjiang. Fracturing is required to access the oil and gas present in these reservoirs. Fracturing fluids are used to increase the amount of oil or gas that can be extracted from the reservoir.

Guar is a branched polysaccharide gelling agent that can be used in fracturing fluids. Gelling agents can increase the viscosity of the fracturing fluid. Various guar derivatives used in fracturing fluids include hydroxypropyl guar (HPG), carboxymethyl guar (CMG), and carboxymethylhydroxypropyl guar (CMHPG).

It would be advantageous if a low cost, low damage, fracturing fluid utilizing a crosslinked hydroxypropyl guar (HPG) fluid system at low polymer concentrations was developed.

SUMMARY

An embodiment of the disclosure is a fracturing fluid comprising 0.12-0.5 wt % HPG; 0.1-0.6 vol % crosslinker A; 0.12 wt % organic amine; and NaOH to pH 8.5-12.0. In an embodiment, the fracturing fluid comprises 0.18 wt % HPG; 0.3 vol % crosslinker A; 0.12 wt % wherein the organic amine is sodium thiosulfate; and NaOH to pH 8.6-11.4. In an embodiment, the fracturing fluid comprises 0.18 wt % HPG; 0.4 vol % crosslinker A; 0.12 wt % wherein the organic amine is sodium thiosulfate; and NaOH to pH 8.6-11.4. In an embodiment, the fracturing fluid comprises 0.18 wt % HPG; 0.3-0.4 vol % crosslinker A; 0.12 wt % wherein the organic amine is sodium thiosulfate; and NaOH to pH 8.6. In an embodiment, the fracturing fluid comprises 0.18 wt % HPG; 0.3-0.4 vol % crosslinker A; 0.12 wt % wherein the organic amine is sodium thiosulfate; and NaOH to pH 10.5. in an embodiment, the fracturing fluid comprises 0.18 wt % HPG; 0.3-0.4 vol % crosslinker A; 0.12 wt % wherein the organic amine is sodium thiosulfate; and NaOH to pH 11.4. In an embodiment, the crosslinker A comprises ulexite.

An embodiment of the disclosure is a method of treating a subterranean formation with a fracturing fluid comprising formulating a crosslinked fracturing fluid; and treating a subterranean formation with the fracturing fluid; wherein the fracturing fluid comprises a crosslinked hydroxypropyl guar (HPG) fluid system comprising: 0.12-0.5 wt % HPG; 0.1-0.6 vol % crosslinker A; 0.12 wt % organic amine; and NaOH to pH 8.5-12.0. In an embodiment, the fracturing fluid comprises 0.18 wt % HPG; 0.3 vol % crosslinker A; 0.12 wt % wherein the organic amine is sodium thiosulfate; and NaOH to pH 8.6-11.4. In an embodiment, the fracturing fluid comprises 0.18 wt % HPG; 0.4 vol % crosslinker A; 0.12 wt % wherein the organic amine is sodium thiosulfate; and NaOH to pH 8.6-11.4. In an embodiment, the fracturing fluid comprises 0.18 wt % HPG; 0.3-0.4 vol % crosslinker A; 0.12 wt % wherein the organic amine is sodium thiosulfate; and NaOH to pH 8.6. In an embodiment, the fracturing fluid comprises 0.18 wt % HPG; 0.3-0.4 vol % crosslinker A; 0.12 wt % wherein the organic amine is sodium thiosulfate; and NaOH to pH 10.5. In an embodiment, the fracturing fluid comprises 0.18 wt % HPG; 0.3-0.4 vol % crosslinker A; 0.12 wt % wherein the organic amine is sodium thiosulfate; and NaOH to pH 11.4.

An embodiment of the disclosure is a system for treating a subterranean formation with a fracturing fluid comprising preparing a fracturing fluid comprising 0.12-0.18 wt % HPG; 0.1-0.6 vol % crosslinker A; 0.12 wt % organic amine; and NaOH to pH 8.5-12.0; and treating a subterranean formation with the fluid. In an embodiment, the fracturing fluid comprises 0.18 wt % HPG; 0.3 vol % crosslinker A; 0.12 wt % wherein the organic amine is sodium thiosulfate; and NaOH to pH 8.6-11.4. In an embodiment, the fracturing fluid comprises 0.18 wt % HPG; 0.4 vol % crosslinker A; 0.12 wt % wherein the organic amine is sodium thiosulfate; and NaOH to pH 8.6-11.4. In an embodiment, the fracturing fluid comprises 0.18 wt % HPG; 0.3-0.4 vol % crosslinker A; 0.12 wt % wherein the organic amine is sodium thiosulfate; and NaOH to pH 8.6. In an embodiment, the fracturing fluid comprises 0.18 wt % HPG; 0.3-0.4 vol % crosslinker A; 0.12 wt % wherein the organic amine is sodium thiosulfate; and NaOH to pH 10.5. In an embodiment, the fracturing fluid comprises 0.18 wt % HPG; 0.3-0.4 vol % crosslinker A; 0.12 wt % wherein the organic amine is sodium thiosulfate; and NaOH to pH 11.4. In an embodiment, crosslinker A comprises ulexite.

In an embodiment, hydroxypropyl guar (HPG) polymer is utilized as a gelling agent for the fracturing fluid. In an embodiment, alternatives include but are not limited to guar. In an embodiment, HPG can be used at amounts of 0.12-0.50 wt %.

In an embodiment, a crosslinker is used to crosslink the HPG or guar. In an embodiment, the crosslinker contains ulexite (Crosslinker A). Ulexite is also referred to as hydrated sodium calcium borate hydroxide or TV rock. In an embodiment, the crosslinker can include other substances in addition to ulexite. The crosslinking is adjustable by using a combination of crosslinker A and the crosslinking aid, sodium hydroxide. In an embodiment, Crosslinker A can be used at amounts of 0.1-0.4 vol %. Alternatives include but are not limited to any crosslinker capable of crosslinking HPG or guar.

In an embodiment, Crosslinker B is Tyzor® 211, a triethanolamine titanium complex crosslinker. It is known to be able to crosslink HPG polymers. Alternatives include but are not limited to any crosslinker capable of crosslinking HPG or guar.

In an embodiment, sodium thiosulfate pentahydrate was used as temperature stabilizer. Sodium thiosulfate can be used at amounts of 0.05-0.25 wt %. Alternatives include but are not limited to ethanolamine.

The foregoing has outlined rather broadly the features of the present disclosure in order that the detailed description that follows may be better understood. Additional features and advantages of the disclosure will be described hereinafter, which form the subject of the claims.

BRIEF DESCRIPTION OF THE DRAWINGS

In order that the manner in which the above-recited and other enhancements and objects of the disclosure are obtained, a more particular description of the disclosure briefly described above will be rendered by reference to specific embodiments thereof which are illustrated in the appended drawings. Understanding that these drawings depict only typical embodiments of the disclosure and are therefore not to be considered limiting of its scope, the disclosure will be described with additional specificity and detail through the use of the accompanying drawings in which.

DETAILED DESCRIPTION

Figure 1:
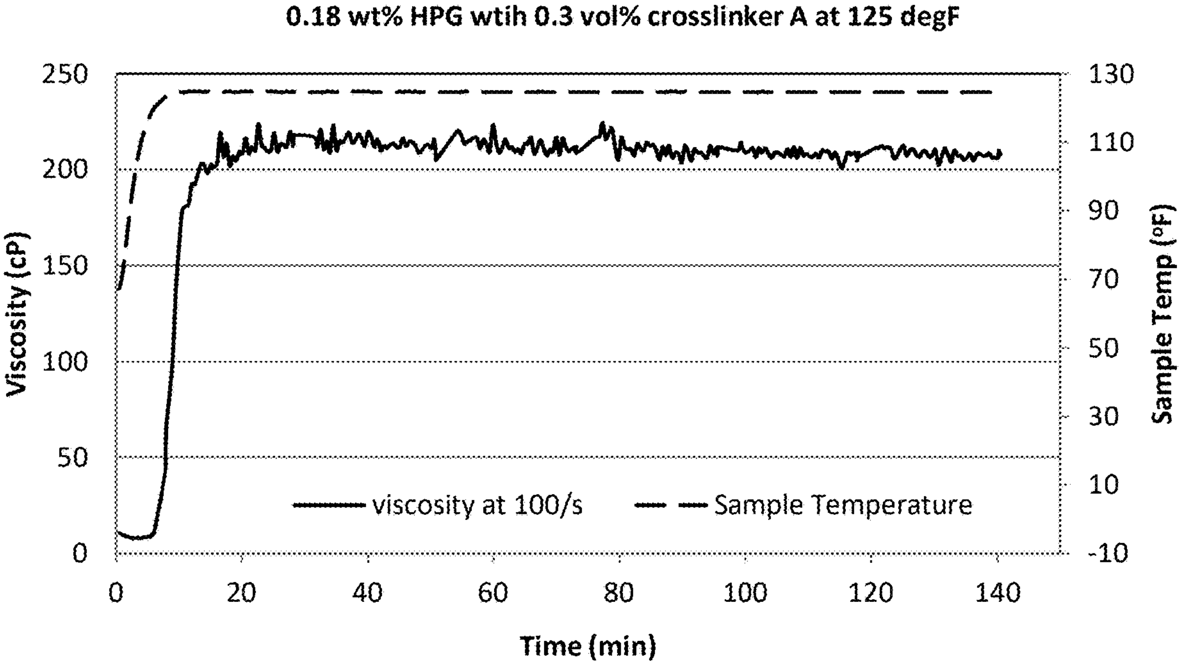
FIG. 1 depicts viscosity at 125° F. of 0.18 wt % HPG fluid system with 0.3 vol % crosslinker A, 0.12 wt % temperature stabilizer sodium thiosulfate pentahydrate, crosslinking aid NaOH to pH 8.6, and 2 wt % KCl.

The particulars shown herein are by way of example and for purposes of illustrative discussion of the preferred embodiments of the present disclosure only and are presented in the cause of providing what is believed to be the most useful and readily understood description of the principles and conceptual aspects of various embodiments of the disclosure. In this regard, no attempt is made to show structural details of the disclosure in more detail than is necessary for the fundamental understanding of the disclosure, the description taken with the drawings making apparent to those skilled in the art how the several forms of the disclosure may be embodied in practice.

The following definitions and explanations are meant and intended to be controlling in any future construction unless clearly and unambiguously modified in the following examples or when application of the meaning renders any construction meaningless or essentially meaningless. In cases where the construction of the term would render it meaningless or essentially meaningless, the definition should be taken from Webster's Dictionary 3rd Edition.

Disclosed herein is a crosslinked HPG fluid system using very low concentration of HPG polymer. A key additive is the crosslinker, but other additives are important as well to make the complete system stable at low polymer concentration. These additives include at least a temperature stabilizer and a crosslinking aid.

In an embodiment, hydroxypropyl guar (HPG) polymer is utilized as a gelling agent for the fracturing fluid. In an embodiment, alternatives include but are not limited to guar. In an embodiment, HPG is used at amounts of 0.12-0.50 wt %. In an embodiment, the guar is used at amounts of 0.12-0.50 wt %. In an embodiment, the HPG is in 2 wt % KCl. In an embodiment, the HPG is not in 2 wt % KCl. In an embodiment, the guar is in 2 wt % KCl. In an embodiment, the guar is not in 2 wt % KCl.

In an embodiment, a crosslinker is used to crosslink the HPG or guar. In an embodiment, the crosslinker contains ulexite (Crosslinker A). Ulexite is also referred to as hydrated sodium calcium borate hydroxide or TV rock. In an embodiment, the crosslinker can include other substances in addition to ulexite. The crosslinking is adjustable by using a combination of crosslinker A and the crosslinking aid, sodium hydroxide. In an embodiment, Crosslinker A can be used at amounts of 0.1-0.6 vol %. In an embodiment, Crosslinker A can be used at amounts of 0.1-0.4 vol %. In an embodiment, Crosslinker A can be used 0.3-0.4 vol %. In an embodiment, Crosslinker A can be used 0.3 vol %. In an embodiment, Crosslinker A can be used 0.4 vol %. In an embodiment, the crosslinker is DBEX-150® or DBXL-90®. In an embodiment, alternatives include but are not limited to any crosslinker capable of crosslinking HPG or guar.

In an embodiment, Crosslinker B is Tyzor® 211, a triethanolamine titanium complex crosslinker. It is known to be able to crosslink HPG polymer. In an embodiment, alternatives include but are not limited to any crosslinker capable of crosslinking HPG or guar.

In an embodiment, sodium thiosulfate pentahydrate was used as temperature stabilizer. In an embodiment, sodium thiosulfate can be used at amounts of 0.05-0.25 wt %. In an embodiment, organic amines can be used as temperature stabilizers. In an embodiment, alternatives include, but are not limited to, ethanolamine.

The fluid system is able to be used at low HPG concentrations (including, but not limited to, 0.12-0.50 wt %) while maintaining stable viscosity (including, but not limited to, 100 cP at 100/s) for over two hours at elevated temperatures (including, but not limited to, 125° F., 150° F., or 175° F.). In an embodiment, the HPG concentration is 0.18 wt %. Any viscosity suitable for transporting proppant at downhole conditions can be utilized. In an embodiment, the fluid systems can be utilized at a pH of 8-12. In an embodiment, the fluid system can be utilized at a pH of 8.3-11.6. In an embodiment, the fluid system can be utilized at a pH of 8.6-11.4. In an embodiment, the fluid system can be utilized at a pH of 8.5-12.0.

Figure 2:
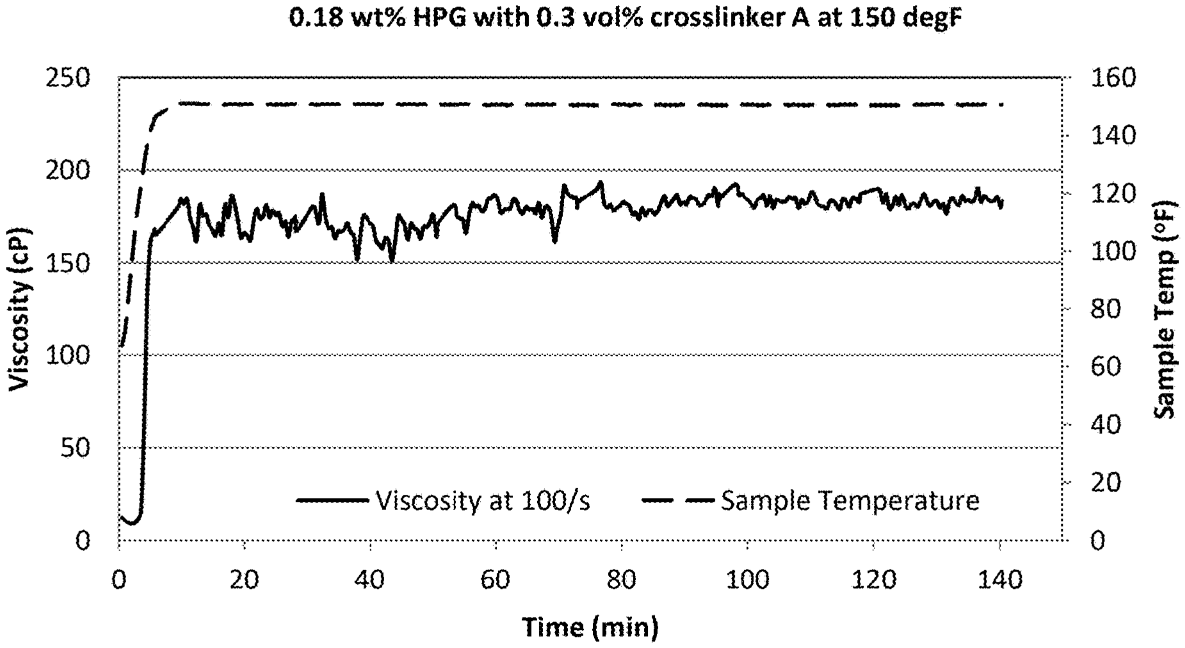
FIG. 2 depicts viscosity at 150° F. of 0.18 wt % HPG fluid system with 0.3 vol % crosslinker A, 0.12 wt % temperature stabilizer sodium thiosulfate pentahydrate, crosslinking aid NaOH to pH 10.5, and 2 wt % KCl.
Figure 3:
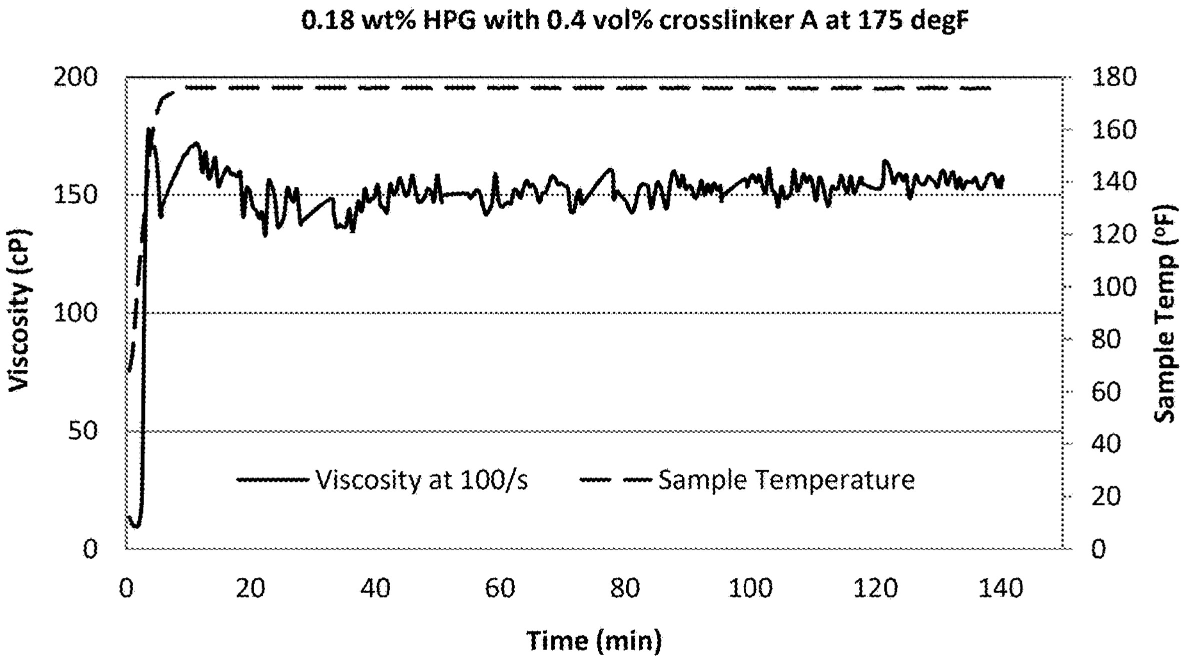
FIG. 3 depicts viscosity at 175° F. of 0.18 wt % HPG fluid system with 0.4 vol % crosslinker A, 0.12 wt % temperature stabilizer sodium thiosulfate pentahydrate, crosslinking aid NaOH to pH 11.4, and 2 wt % KCl.

The fracturing fluid of the present disclosure provides the advantage of greater viscosity than fracturing fluids known in the art. FIG. 1, FIG. 2, and FIG. 3 depicts that viscosities of approximately 150-225 cP can be obtained. Greater viscosity results in being able to transport proppant more effectively.

EXAMPLES

Example 1

HPG polymer was obtained from Solvay. HPG at a loading of 0.18 wt % was hydrated in 2 wt % potassium chloride tap water. Next, the temperature stabilizer sodium thiosulfate, crosslinking aid sodium hydroxide, and Crosslinker A were added.

Crosslinker A was obtained from Economy Polymers and contained ulexite. In this example, crosslinker A is DBEX-150® in the form of a liquid slurry. The crosslinking was adjustable by varying the amount of crosslinker A and the crosslinking aid sodium hydroxide. Sodium thiosulfate pentahydrate was obtained from Sigma Aldrich and was used as temperature stabilizer.

The resulting fluid was tested on a Chandler 5550 rheometer equipped with a B1 bob. The viscosity of the fluid was measured at a constant temperature for two hours.

FIG. 1, FIG. 2, and FIG. 3 show that at three representative temperatures (125° F., 150° F., and 175° F.), the HPG fluid was able to crosslink with delay and to maintain stable viscosity well above 100 cP at 100/s for two hours. Even at the low concentration of 0.18 wt % HPG, the fluid exhibited excellent viscosity needed for transporting proppant at downhole conditions. The pH was optimized according to the temperature by using the crosslinking aid sodium hydroxide.

Example 2

Figure 4:
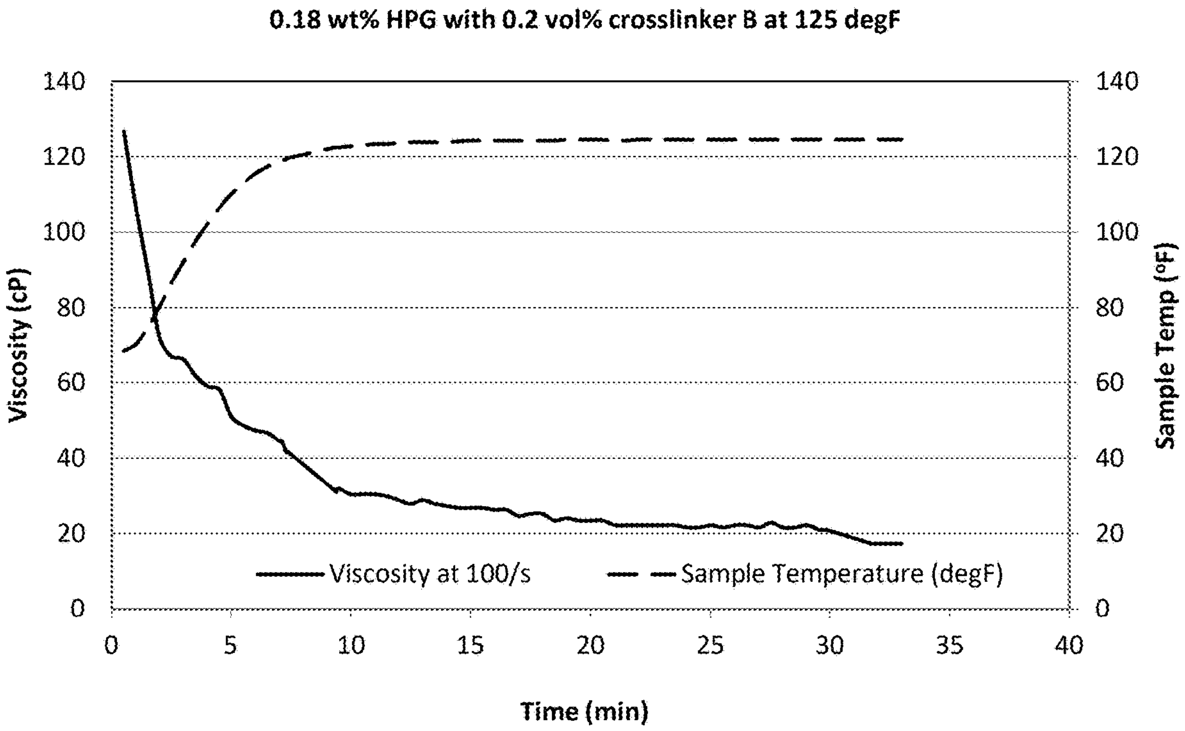
FIG. 4 depicts viscosity at 125° F. of 0.18 wt % HPG fluid system with 0.2 vol % crosslinker B, 0.12 wt % temperature stabilizer sodium thiosulfate pentahydrate, and 2 wt % KCl at pH 8.6.

HPG polymer can be crosslinked with a titanium crosslinker. For comparison with the performance of boron crosslinker A, Tyzor® 211 titanium crosslinker (Crosslinker B) was tested at similar conditions. Tyzor® 211 is a triethanolamine titanium complex crosslinker obtained from Dorf Ketal that is known to be able to crosslink HPG polymer. The fluid was prepared by hydrating HPG followed by addition of other additives. The fluid initially crosslinked at ambient temperature, but quickly lost its viscosity once heated (FIG. 4). With a remaining viscosity of less than 20 cP, it was not suitable for carrying proppant.

All of the compositions and methods disclosed and claimed herein can be made and executed without undue experimentation in light of the present disclosure. While the compositions and methods of this disclosure have been described in terms of preferred embodiments, it will be apparent to those of skill in the art that variations may be applied to the compositions and methods and in the steps or in the sequence of steps of the methods described herein without departing from the concept, spirit and scope of the disclosure. More specifically, it will be apparent that certain agents which are both chemically related may be substituted for the agents described herein while the same or similar results would be achieved. All such similar substitutes and modifications apparent to those skilled in the art are deemed to be within the spirit, scope and concept of the disclosure as defined by the appended claims.

What is claimed is:

1. A method of treating a subterranean formation with a fracturing fluid, comprising:
- formulating a crosslinked fracturing fluid; and
- treating a subterranean formation with the fracturing fluid;
- wherein the fracturing fluid comprises a crosslinked hydroxypropyl guar ("HPG") fluid system comprising:
  - 0.12-0.5 wt % HPG;
  - 0.1-0.6 vol % ulexite;
  - 0.12 wt % sodium thiosulfate; and
  - NaOH to adjust the pH of the fracturing fluid to between 8.5-12.0;
  - wherein the fracturing fluid is at a temperature in a temperature range of 125 to 175 degrees Fahrenheit, and wherein viscosity of the fracturing fluid remains between a first viscosity value and a second viscosity value for at least 2 hours at the temperature, wherein a difference between the first viscosity value and the second viscosity value is 50 cP or less.

2. The method of treating a subterranean formation of claim 1, wherein the fracturing fluid comprises:
- 0.18 wt % HPG;
- 0.3 vol % ulexite;
- 0.12 wt % sodium thiosulfate; and
- NaOH to adjust the pH of the fracturing fluid to between 8.6-11.4.

3. The method of treating a subterranean formation of claim 1, wherein the fracturing fluid comprises:
- 0.18 wt % HPG;
- 0.4 vol % ulexite;
- 0.12 wt % sodium thiosulfate; and
- NaOH to adjust the pH of the fracturing fluid to between 8.6-11.4.

4. The method of treating a subterranean formation of claim 1, wherein the fracturing fluid comprises:
- 0.18 wt % HPG;
- 0.3-0.4 vol % ulexite;
- 0.12 wt % sodium thiosulfate; and
- NaOH to adjust the pH of the fracturing fluid to 8.6.

5. The method of treating a subterranean formation of claim 1, wherein the fracturing fluid comprises:
- 0.18 wt % HPG;
- 0.3-0.4 vol % ulexite;
- 0.12 wt % sodium thiosulfate; and
- NaOH to adjust the pH of the fracturing fluid to 10.5.

6. The method of treating a subterranean formation of claim 1, wherein the fracturing fluid comprises:
- 0.18 wt % HPG;
- 0.3-0.4 vol % ulexite;
- 0.12 wt % sodium thiosulfate; and
- NaOH to adjust the pH of the fracturing fluid to 11.4.

7. A system for treating a subterranean formation with a fracturing fluid, comprising:
- preparing a fracturing fluid comprising:
  - 0.12-0.18 wt % hydroxypropyl guar ("HPG");
  - 0.1-0.6 vol % ulexite;
  - 0.12 wt % sodium thiosulfate; and
  - NaOH to adjust the pH of the fracturing fluid to between 8.5-12.0;
  - wherein the fracturing fluid is at a temperature in a temperature range of 125 to 175 degrees Fahrenheit, and wherein viscosity of the fracturing fluid remains between a first viscosity value and a second viscosity value for at least 2 hours at the temperature, wherein a difference between the first viscosity value and the second viscosity value is 50 cP or less; and
- treating a subterranean formation with the fracturing fluid.

8. The system for treating a subterranean formation of claim 7, wherein the fracturing fluid comprises:
- 0.18 wt % HPG;
- 0.3 vol % ulexite;
- 0.12 wt % sodium thiosulfate; and
- NaOH to adjust the pH of the fracturing fluid to between 8.6-11.4.

9. The system for treating a subterranean formation of claim 7, wherein the fracturing fluid comprises:
- 0.18 wt % HPG;
- 0.4 vol % ulexite;
- 0.12 wt % sodium thiosulfate; and
- NaOH to adjust the pH of the fracturing fluid to between 8.6-11.4.

10. The system for treating a subterranean formation of claim 7, wherein the fracturing fluid comprises:
- 0.18 wt % HPG;
- 0.3-0.4 vol % ulexite;
- 0.12 wt % sodium thiosulfate; and
- NaOH to adjust the pH of the fracturing fluid to 8.6.

11. The system for treating a subterranean formation of claim 7, wherein the fracturing fluid comprises:
- 0.18 wt % HPG;
- 0.3-0.4 vol % ulexite;
- 0.12 wt % sodium thiosulfate; and
- NaOH to adjust the pH of the fracturing fluid to 10.5.

12. The system for treating a subterranean formation of claim 7, wherein the fracturing fluid comprises:

0.18 wt % HPG;
0.3-0.4 vol % ulexite;
0.12 wt % sodium thiosulfate; and
NaOH to adjust the pH of the fracturing fluid to 11.4.

* * * * *